(12) United States Patent
Babonneau et al.

(10) Patent No.: US 6,396,876 B1
(45) Date of Patent: May 28, 2002

(54) PREPROCESSING PROCESS AND DEVICE FOR MOTION ESTIMATION

(75) Inventors: Jean-Yves Babonneau, Le Rheu; Gérard Briand, Ploufragan; Yannick Olivier, Rennes; Philippe Robert, Thorigné, all of (FR)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/128,511

(22) Filed: Aug. 3, 1998

(30) Foreign Application Priority Data

Aug. 4, 1997 (FR) .............................................. 9709941

(51) Int. Cl.⁷ ............................. H04B 1/66; H04N 5/21; H04N 5/14
(52) U.S. Cl. .................... 375/240.29; 348/620; 348/701
(58) Field of Search ................................ 348/700, 701, 348/620; 375/240.29; H04N 5/21

(56) References Cited

U.S. PATENT DOCUMENTS

| | | | |
|---|---|---|---|
| 5,049,993 A | 9/1991 | LeGall et al. ............... | 348/448 |
| 5,572,565 A | 11/1996 | Abdel-Mottaleb ........... | 378/37 |
| 5,742,343 A | 4/1998 | Haskell et al. ......... | 375/240.15 |
| 5,847,772 A | 12/1998 | Wells ......................... | 348/571 |
| 5,867,225 A | 2/1999 | Keating et al. ............. | 348/555 |
| 5,978,823 A | 11/1999 | Koslov et al. .............. | 708/313 |
| 6,037,986 A | * 3/2000 | Zhang et al. .......... | 375/240.12 |
| 6,041,142 A | 3/2000 | Rao et al. ................... | 382/232 |

FOREIGN PATENT DOCUMENTS

EP      0781041 A1    6/1997

* cited by examiner

Primary Examiner—Howard Britton
(74) Attorney, Agent, or Firm—Joseph S. Tripoli; Jospeh J. Laks; Ronald H. Kurdyla

(57) ABSTRACT

The invention relates to a method of preprocessing a video image sequence consisting of a succession of interlaced frames for estimating motion between a first and a second frame, characterized in that a temporal filtering is performed on the basis of at least two input frames so as to deliver each of the two frames utilized by the motion estimator. The applications relate to motion estimators, in the field of video image compression or the conversion of television standards.

12 Claims, 3 Drawing Sheets

PREPROCESSING PROCESS AND DEVICE FOR MOTION ESTIMATION

BACKGROUND OF THE INVENTION

The invention relates to a preprocessing method for a motion estimator utilized in he processing of television image sequences.

Motion estimation is becoming ever more important in systems such as standards converters, high-frequency converters better known as "up-converters", de-interlacers or coders, while the algorithms are becoming more powerful and more easily integrated.

There are various types of motion estimator, for example the block-matching type, the point-to-point or "recursive-pel" type. In order to improve the operation of these motion estimators and raise their performance, the images transmitted to them are generally preprocessed. This may, for example, be a subsampling followed by a filtering so as to reduce the size of the image in order to simplify the circuits and increase the processing speed, a low-pass filtering to remove some of the high frequencies so as to facilitate the operation of the motion estimator, a line interpolation for each frame so as to obtain new frames whose lines correspond (this is in fact a de-interlacing), etc. For example the estimator of the recursive-pel type described in French Patent No. 8812468 requires a preprocessing of the images in order to operate satisfactorily. Likewise, the estimators of the "block-matching" type are often preceded by a preprocessing of the images.

Motion estimators operate imperfectly with regard to interlaced images containing horizontal contours: there is spectral aliasing in these areas, and the successive frames, exhibiting different lines, are not correlated there. Motion estimators such as those of the recursive-pel type then diverge in these areas.

The preprocessing operations described earlier, for example spatial filtering, bring about an overall improvement in the performance of the estimators but do not satisfactorily resolve the defects of motion estimation which may be particularly visible in the motion-compensated or estimated image and give rise to a degradation in the quality of the image.

The aim of the invention is to alleviate the aforementioned drawbacks.

SUMMARY OF THE INVENTION

Its subject is a method of preprocessing a video image sequence consisting of a succession of interlaced frames for estimating motion between a first and a second frame, characterized in that a temporal filtering is performed on the basis of at least two input frames so as to deliver each of the two frames utilized by the motion estimator.

Its subject is also a device for implementing the method, characterized in that it comprises:

- a memory for storing four successive interlaced frames,
- vertical filters for transforming these four stored interlaced frames into four progressive frames,
- a temporal filter for delivering two filtered frames, the first on the basis of the progressive frames corresponding to the first three stored frames and the second on the basis of the progressive frames corresponding to the last three stored frames,
- the motion estimation being carried out on the basis of these two filtered frames.

The characteristics and advantages of the present invention will emerge better from the following description given by way of example and with reference to the appended figures.

DETAILED DESCRIPTION

The method carries out 3-frame spatio-temporal filtering, a spatial filtering of the interlaced frames to obtain progressive frames and then a temporal filtering of three successive progressive frames. By virtue of this preprocessing of the images, the performance of the motion estimator is improved, in particular in areas which possess horizontal contours, generally critical areas.

Figure 1:
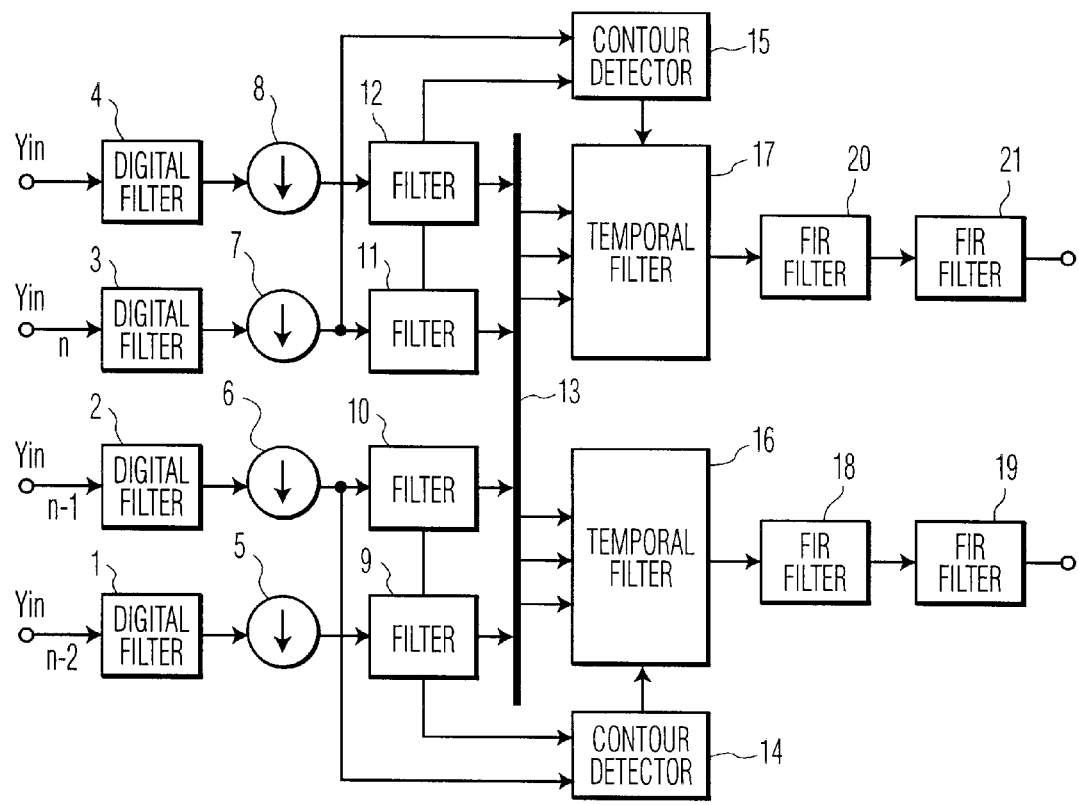
FIG. 1 represents a preprocessing device according to the invention for a motion estimator.

FIG. 1 represents a processing device according to the invention.

The digital video luminance information for an image sequence originating from a video source, in the form of successive interlaced frames, is stored beforehand in an image memory. This is a four-frame memory, not represented in the figure since it is not generally specific to the device. This memory transmits to the four inputs of the preprocessing device as represented in FIG. 1, together with the frame of index n+1 called $Yin_{n+1}$, the preceding frames $Yin_{n-2}$, $Yin_{n-1}$, $Yin_n$.

The four successive interlaced frames are transmitted simultaneously, line by line, to the four inputs. Each of these inputs $Yin_{n-2}$, $Yin_{n-1}$, $Yin_n$ and $Yin_{n+1}$ is respectively linked to a digital filter 1, 2, 3, 4, half-band horizontal digital filters with finite impulse response (FIR). The outputs of these filters are linked respectively to the inputs of sampler-by-2 circuits for the horizontal frequencies 5, 6, 7, 8. The outputs of these samplers are linked respectively to the inputs of half-band vertical FIR filters 9, 10, 11, 12. The output of the subsampler 6 is also linked to an input of a contour detector 14 and the output of the subsampler 7 to an input of a contour detector 15. The outputs of the filters 9, 10, 11, 12 are transmitted to the inputs of temporal filters 16 and 17 via, for example, a distribution bus 13. Thus, the filtered frame signals coming from the filters 9, 10, 11 are received on three inputs of the temporal filter 16, and the filtered frame signals coming from the filters 10, 11, 12 are received on three inputs of the temporal filter 17. A second output of the filter 10 and of the filter 12 is linked respectively to a second input of the contour detector 14 and 15. The output of the filter 16 is linked to the input of a quarter-band horizontal FIR filter 18 and then to the input of a quarter-band vertical FIR filter 19. The output of the filter 17 is linked to the input of a quarter-band horizontal FIR filter 20 and then to the input of a quarter-band vertical FIR filter 21. The outputs of the filters 19 and 21 are the outputs of the preprocessing device.

The digital video luminance signals arriving at each of the four inputs of the device are thus filtered horizontally at half their bandwidth with the aid of horizontal one-dimensional FIR filters with 8 coefficients. These are anti-spectral aliasing filters, hence placed upstream of the horizontal subsampler and the coefficients of which, in our example, are:

−22/1024; 43/1024; 135/1024; 442/1024; 442/1024; 135/1024; −43/1024; −22/1024;

The signal output by each filter is then subsampled by a sampler, a horizontal decimation by a factor of two being performed on this signal. The purpose of such sampling is to adapt the resolution of the image to the current processing capacity of the motion estimation circuits.

In the remaining discussion, the assumption will be made that the progressive frames calculated for the temporal filtering and for transmission to the motion estimator are aligned with the odd frames input to the device.

The mode of operation is described at two different instants, the instant t1, corresponding to the presence, on the four inputs of the device, of the frames $Yin_{n-2}$ to $Yin_{n+1}$, as represented in the diagram, the later instant t2 corresponding to the presence of the frames $Yin_{n-1}$ to $Yin_{n+2}$. Let us make the assumption that the frame of index n is odd.

Instant t1

The sampled signals obtained at the output of the filter 1 and of the filter 3 and corresponding to the odd frames n-2 and n are vertically filtered at half the bandwidth with the aid of a half-band, vertical one-dimensional FIR filter 9, 11, with 3 coefficients. The coefficients chosen for these filters are: 0.25; 0.50; 0.25;

Thus, the frames obtained at the output of these half-band vertical filters, which will be called $Yv_{n-2}$ and $Yv_n$ have their lines positioned on the lines of the input frames, the luminance values being obtained by the weighted averaging of the luminances of the current line, the preceding line and the line previous (above) to the preceding line. The result corresponds to the preceding line. These are frames aligned with the odd frames.

The sampled signals obtained at the output of the filter 2 and of the filter 4 and corresponding to the even frames n-1 and n+1 are vertically filtered at half the bandwidth with the aid of a half-band, vertical one-dimensional FIR filter 10, 12 with 2 coefficients which are chosen to be equal to 0.50.

Here, the frames obtained, which will be called $Yv_{n-1}$ and $Yv_{n+1}$ have their lines positioned between the lines of the input frames n-1 and n+1 and these lines are therefore in correspondence with the progressive frames obtained from the frames n-2 and n. This is because the luminance value of the pixels of the line generated is obtained by averaging the luminance values of the pixels of the line below (current line) and of the line above (previous). Hence, these also are frames aligned with the odd frames.

Instant t2

The signals arriving at the filter 9 and 11 originate from the even frames n-1 and n+1. The filtering used is now a half-band vertical one-dimensional filtering with two coefficients which are chosen to be equal to 0.50. The frames obtained $Yv_{n-1}$ and $Yv_{n-1}$ therefore have their lines aligned with the odd frames.

The signals arriving at the filter 10 and 12 originate from the odd frames n and n+2. The filtering used by these filters is now a half-band vertical one-dimensional filtering with 3 coefficients which are chosen to be equal to 0.25, 0.50, 0.25. The frames obtained $Yv_n$ and $Yv_{n+2}$ therefore have their lines aligned with the odd frames.

Thus, frames $Yv_{n-2}$, $Yv_{n-1}$, $Yv_n$, $Yv_{n+1}$ are output at the instant t1 and frames $Yv_{n-1}$, $Yv_n$, $Yv_{n+1}$, $Yv_{n+2}$ are output at the instant t2 from the vertical half-band filters 9, 10, 11, 12, which perform, alternately and according to the parity of the frames received, a two-coefficient filtering and a three-coefficient filtering. These frames are all aligned with the odd frames (it would have been equally possible to produce alignment with the frames of even parity). It is these progressive frames which are utilized by the temporal filters.

The temporal filters also receive information from the contour detection circuits 14 and 15.

At the instant t1, the circuit 14 simultaneously receives a line from the even frame n-1 originating from the sampler 6 and the preceding line of this frame n-1 stored in the filter 10 and originating from this filter. The circuit 15 receives a line from the odd frame n and the preceding line of this frame stored by the filter 11. At the instant t2, the parities of the frames and hence of the lines are reversed. The obtaining of the binary contour information transmitted by the circuits 14 and 15 to the temporal filter will be explained later.

The remainder of the description refers solely to the instant t1, the manner of operation being identical for the instant t2, the images processed by the circuits downstream being progressive.

A first temporal filtering acting on the three frames $Yv_{n-1}$, $Yv_n$, $Yv_{n+1}$ is performed by the temporal filter 17. The calculation of a current pixel from a current line takes into account the luminances of each of the pixels of the frames $Yv_{n-1}$, $Yv_n$, $Yv_{n+1}$ corresponding to the position of the current pixel (same line, same column), by respectively weighting these values using the filter coefficients which are chosen to be equal to:

13/64; 38/64; 13/64.

These values can be parameterized and are given by way of example. They could be chosen to be equal to 1/3, 1/3, 1/3.

The output is therefore temporally centred on the central element of the trio.

This temporal filter 17 is enabled solely on the high vertical frequencies in the image. To do this, the horizontally subsampled central frame $Yin_n$ is transmitted, two lines at a time, the current line and the preceding line, to a horizontal contour detector 15 described later, the role of which is to determine the areas corresponding to these high vertical frequencies.

The signal $yt_n$ output by the temporal filter 17 which corresponds to the filtered signal for the areas detected, or else to the frame $Yv_n$ for the non-relevant areas, is then transmitted in succession to two quarter-band filters 20, 21, a first quarter-band horizontal filter with 5 coefficients and then a second quarter-band vertical filter with 5 coefficients. The role of these filters is to render the image slightly blurred so as to facilitate motion estimation. The gradients on the contours of objects are corrected to allow the convergence of the motion estimator utilizing a gradient algorithm. The signal output by these filtering circuits is the output signal $Ye_n$ of the preprocessing device, which signal is transmitted to a first input of a motion estimator, the latter not being represented in the figure.

A second temporal filtering acting on the three frames $Yv_{n-2}, Yv_{n-1}, Yv_n$ is performed simultaneously. As indicated previously, it takes into account luminances of the trio of pixels corresponding to the current pixel and to the frames $Yv_{n-2}$, $Yv_{n-1}$, $Yv_n$ by respectively weighting these values using the filter coefficients which are chosen to be equal to:

13/64; 38/64; 13/64.

This temporal filter 16 is enabled solely on the high vertical frequencies in the image. To do this, the horizontally subsampled frame $Yin_{n-1}$ is transmitted, two lines at a time, the current line and the preceding line, to a horizontal contour detector 14 described later, the role of which is to determine the areas corresponding to these high vertical frequencies.

The signal output by the temporal filter 16 which corresponds to the filtered signal for the areas detected, or else to the frame $Yv_{n-1}$ for the non-relevant areas is then transmitted in succession to two quarter-band filters 18, 19, a first quarter-band horizontal filter with 5 coefficients and then a second quarter-band vertical filter with 5 coefficients. The role of these filters is to render the image slightly blurred so as to facilitate motion estimation. The signal output by these filtering circuits is the output signal $Ye_{n-1}$ of the preprocessing device, which signal is transmitted to a second input of a motion estimator, he latter not being represented in the figure.

Figure 2:
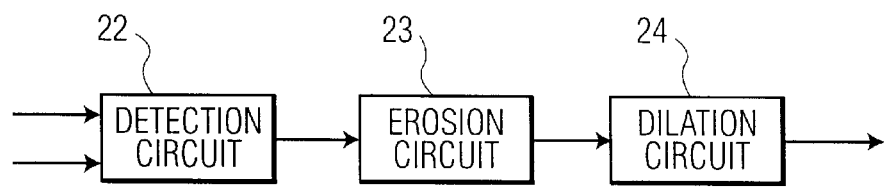
FIG. 2 represents a contour detection circuit.

The function of the contour detection circuits 14 and 15 is to detect horizontal contours in the image. The diagram of such a circuit is represented in FIG. 2.

The previously mentioned two inputs of the edge detection circuit are the two inputs of a vertical gradient detection circuit 22. This circuit 22 is linked to an erosion circuit 23 and then to a dilation circuit 24 whose output is transmitted to the temporal filter.

For each pixel of the image, the vertical gradient detection circuit performs a measurement of gradient over a sliding window of dimension five horizontal pixels by two vertical pixels. To do this, each input delivers a line of the frame i+1, that output by the sampler 6 or 7, on the first input and a preceding line i, that stored in the filter 10 or 11, on the second input, these two lines being of even or odd frame depending on the contour detector investigated at a given instant or else depending on the instant considered in respect of a given contour detector. For each pixel of line i and column j, the sum is calculated of the differences in luminance between the pixel of line i and the pixel, beneath, of line i+1 (or i+2 if it is desired to retain the line numbering of the interlaced frames), which summation is performed for the current pixel and the four adjoining pixels on the same line. This aggregate is compared with a threshold Thr.

If the following criterion is complied with:

$$\sum_{j=-2}^{j=+2} |Y(i, j) - Y(i+1, j)| \geq Thr$$

where $Y(i, j)$ represents the luminance value of the pixel at line i and column j of the current frame and Thr the threshold value, chosen to be equal to 192 for example, the binary value, one, is assigned to the current pixel corresponding to this aggregate. In the contrary case, the zero value is allocated.

The binary image of horizontal contour information thus obtained is then processed by mathematical morphology.

The binary image transmitted to the erosion circuit 23 is generally relatively noisy and requires to be filtered.

An erosion in the horizontal direction is performed on the basis of a sliding window of dimension nine horizontal pixels by one vertical pixel. The threshold is for example fixed at the value 3. For each current pixel (situated in the middle of the window) having the value one, a count is made of the pixels in the window having the value one and if the number obtained is less than or equal to the threshold, the current pixel is set to the value zero. This processing is non-recursive and it is the value of the pixels of the initial image and not the new value calculated for the current pixel which is taken into account when calculating the next current pixel.

A dilation is then performed in two steps:

A dilation in the horizontal direction is carried out on the basis of a window with dimensions nine horizontal pixels by one vertical pixel. The threshold is chosen to be equal to three.

A dilation in the vertical direction is then performed on the basis of a sliding window of dimension one horizontal pixel by two vertical pixels. The threshold is fixed for example at the value 1.

For each of these dilations, when the current pixel has the value zero, the number of pixels having the value one is counted in this window and if this number is greater than or equal to the threshold, then the current pixel is set to the value one.

The window used for the vertical dilation is causal, that is to say it includes the current pixel and the pixel above. Consequently the method does not involve any additional processing delay.

An item of information in binary form corresponding to the pixels which are marked or unmarked, that is to say which are involved or are not involved in the temporal filtering, is available at the output, of the contour detection circuits for each current line. It is this item of information which is transmitted to the temporal filters.

The frame utilized for such contour detection is the frame Yin, for detector 15 and the frame $Yin_{n-1}$ for detector 14.

FIG. 3 represents the pixels of the lines of the various frames n−2 to n+1 at various steps of the preprocessing method.

The time is represented along the abscissa, the axis being oriented towards the left and graduated in terms of frames n−2 to n+1, the lines of a frame being labelled along the ordinate axis.

Figure 3A:
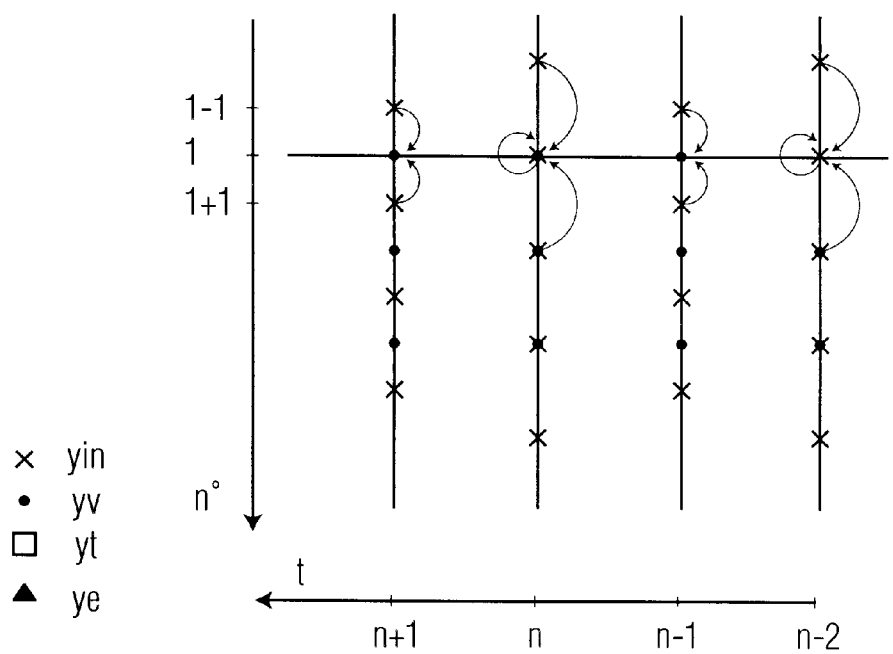
FIG. 3 represents the frames of the images in the preprocessing chain.

FIG. 3a relates to the obtaining of the progressive frames, (also called images), Yv from the input frames Yin.

L is an odd line and, for frame n−2 and n, the pixels of lines l −2, l and l+2 are used to construct the pixel of line l of frame $yv_{n-2}$ and $yv_n$. For the odd frames n−1 and n+1, the pixels of lines l−1 and l+1 make it possible to obtain the pixel of line l of frames $Yv_{n-1}$ and $Yv_{n-1}$.

Figure 3B:
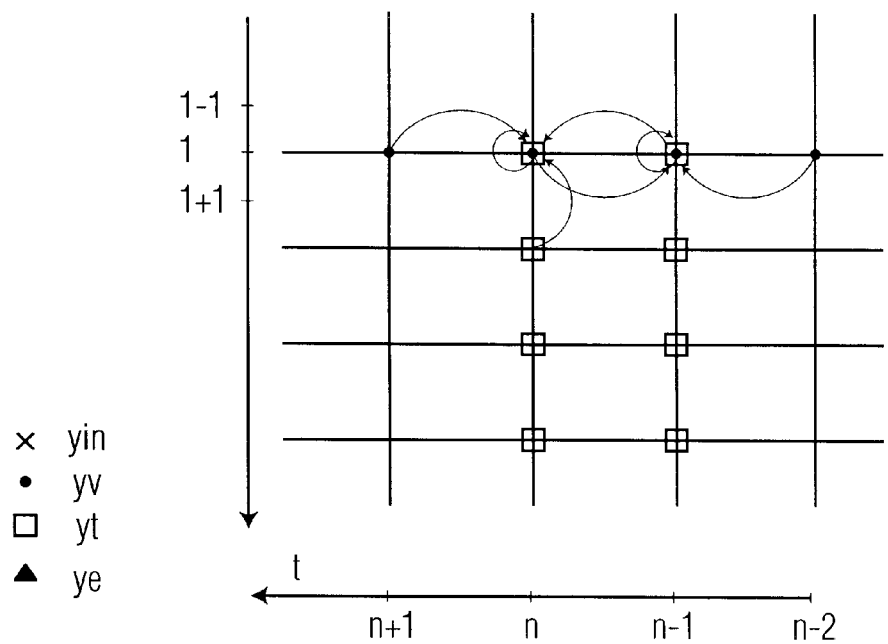

FIG. 3b relates to the temporal filtering. The pixels of line l for frame $Yv_{n-2}$, $Yv_{n-1}$ and $Yv_n$ are processed to yield the pixel of line l of the filtered frame $Yt_{n-1}$. The pixels of line l for frame $Yv_{n-1}$, $Yv_n$ and $Yv_{n+1}$ are processed to yield the pixel of line l of the filtered frame $Yt_n$.

Figure 3C:
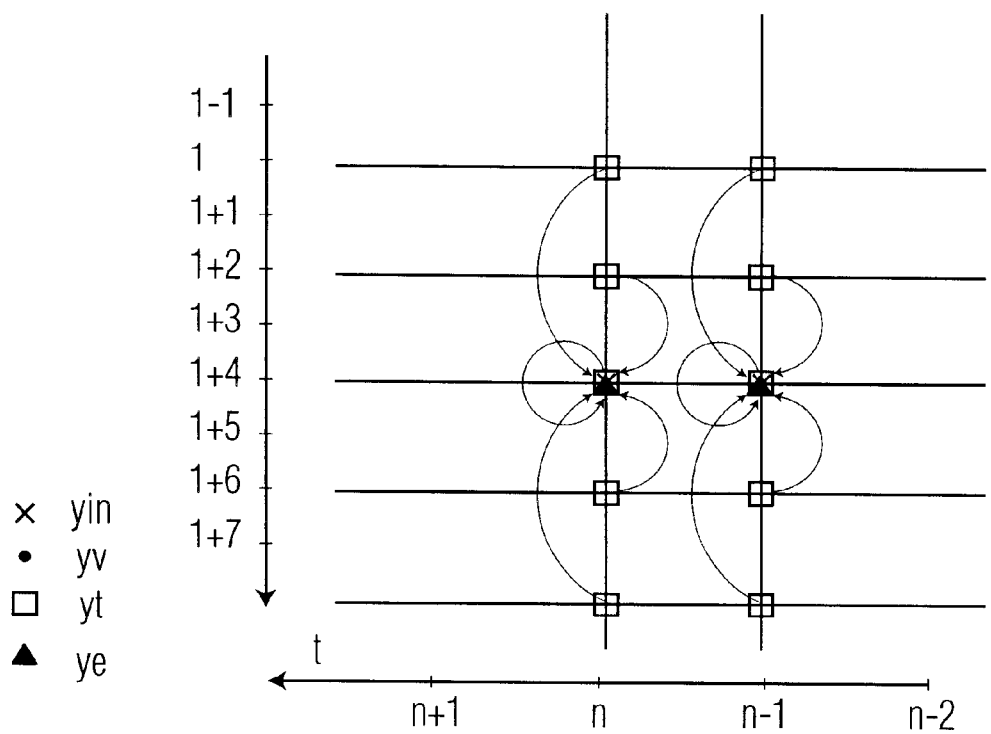

FIG. 3c represents the obtaining of the output frames (pixels) Yc from the frames Yt output by the temporal filters (filters 18 and 20).

The pixels of lines l, l+2, l+4, l+6 and l+8 of frame $Yt_{n-1}$ are filtered to yield a pixel in line l+4 or frame $Ye_{n-1}$ at the output of the device.

The pixels of lines l, l+2, l+4, l+6 and l+8 of frame $Yt_n$ are filtered to yield a pixel in line l+4 for flame $Ye_n$ at the output of the device.

The motion estimator receives the progressive frames $Ye_{n-1}$ and $Ye_n$, corresponding, in our example, to frames aligned with the odd lines which it will compare in order to calculate the motion vectors.

Let us return to FIG. 1 to explain the processing which is performed with regard to the lines of frames. Let us take for example lines 100 and 101 which are received at the same instant at the input of the device, line 100 corresponding to the even frames $Y_{n-1}$ and $Y_{n+1}$ and line 101 to the odd frames $Y_{n-2}$ and $Y_n$. These lines are transmitted, after horizontal filtering and sampling, to the half-band vertical filters.

The filters 9 and 11 deliver, after receiving the filtered and sampled line 101, a filtered line 99 which, for this filtering, utilizes lines 97, 99 and 101 as explained earlier. At the same time, the filters 10 and 12, after receiving the filtered and sampled line 100, output a line 99 which is calculated on the basis of lines 98 and 100.

The old lines of four progressive frames are obtained in this way at the output of the filters. Line 99 of three of them (n−2, n−1, n) is transmitted to a first temporal filter which carries out this filtering in order to deliver this same line 99 filtered. The second temporal filter simultaneously uses line 99 of the next three progressive frames (n−1, n, n+1) which is available at the same instant, in order to deliver this same line 99 filtered.

The quarter-band vertical filters utilize the preceding filtered lines 91, 93, 95, 97 and the filtered line 99 to output the median line 95 which is also, after quarter-band horizontal filtering, that output by the preprocessing device.

The so-called "horizontal" contours of an image are rarely perfectly horizontal and these lines show up, for the frames, as staircasing. The purpose of these processing operations is to provide the best possible reconstruction, in a progressive frame, of the information contained in the interlaced frames, in particular when the calculated progressive frame is shifted, with regard to the lines, with respect to the corresponding input frames (in our example when the progressive frame is calculated from even frames). The motion estimation will be of better quality, the correlation thus being stronger between the two progressive frames which are involved in the motion estimator. The morphological operators therefore also have an image reconstruction function.

The temporal filtering will also create echoes with regard to which the motion estimation is naturally performed, thereby improving this estimation, since all the images transmitted to the estimator undergo the same processing and the gradients of the echoes have the same speed as the gradients of the original image.

When complex objects intersect, the temporal filtering algorithm is less powerful and this is why the temporal filtering is reserved for the areas with horizontal contours. The risks of impairing the information contained in the image, due to this filtering, for example in the case of appearing or disappearing areas or of intersecting objects, are thus limited.

The temporal filtering could of course be performed on the complete image and the selection of the filtered areas be performed subsequently. This selection is optional.

The separation into two temporal filters and two contour detectors is of course arbitrary and it would be equally possible to use a common filtering circuit and/or a common contour detection circuit, these common circuits being adapted to process the information received on each of the circuits described in FIG. 1.

Moreover, the image memory for storing the successive frames of the image sequence and distributing them simultaneously, line by line, to the filters, may also be regarded as an integral part of the preprocessing device.

What is claimed is:

1. Method of preprocessing a video image sequence consisting of a succession of interlaced frames for estimating motion between a first and a second frame, characterized in that a temporal filtering is performed on the basis of at least two input frames so as to deliver each of the two frames utilized by the motion estimator.

2. Method according to claim 1, characterized in that the temporal filtering is performed on progressive frames obtained by vertical filtering.

3. Method according to claim 2, characterized in that a first vertical filtering is performed on the even input frames and a second vertical filtering is performed on the odd input frames so as to obtain progressive frames, all aligned with an input frame of predefined parity.

4. Method according to claim 3, characterized in that, prior to the vertical filtering, a half-band horizontal filtering is carried out on the input frames, followed by a horizontal decimation on the images thus filtered.

5. Method according to claim 1, characterized in that it stores four successive frames and in that a first temporal filtering is performed on the basis of the first three stored frames so as to deliver the first frame to the motion estimator and in that a second temporal filtering is performed on the basis of the last three stored frames so as to deliver the second frame to the motion estimator.

6. Method according to claim 5, characterized in that the temporal filtering on the frames is performed line by line.

7. Method according to claim 1, characterized in that the temporally filtered frames are next filtered horizontally by a quarter-band filter.

8. Method according to claim 1, characterized in that the temporally filtered frames are next filtered vertically by a quarter-band filter.

9. Method according to claim 1, characterized in that a detection of the horizontal contours is performed on the input frames and in that the temporal filtering is performed on only those regions which contain such contours.

10. Method according to claim 9, characterized in that the detection of contours is performed on the basis of gradient operators, followed by morphological operations of the erosion and dilation type.

11. Preprocessing device receiving a video image sequence consisting of a succession of interlaced frames for a motion estimation between a first and a second frame, characterized in that it comprises:

a memory for storing four successive interlaced frames, vertical filters for transforming these four stored interlaced frames into four progressive frames, a temporal filter for delivering two filtered frames, the first on the basis of the progressive frames corresponding to the first three stored frames and the second on the basis of the progressive frames corresponding to the last three stored frames, the motion estimation being carried out on the basis of these two filtered frames.

12. Device according to claim 11, characterized in that it comprises in series a quarter-band vertical filter and a quarter-band horizontal filter for filtering the frames output by the temporal filters before carrying out the motion estimation.

* * * * *